United States Patent
Robinson et al.

(10) Patent No.: US 11,018,715 B2
(45) Date of Patent: *May 25, 2021

(54) RELIABLE ORTHOGONAL SPREADING CODES IN WIRELESS COMMUNICATION

(71) Applicant: Rampart Communications, Inc., Annapolis, MD (US)

(72) Inventors: Matthew Brandon Robinson, Crownsville, MD (US); Andrew Keith Palmisano, Laurel, MD (US); Kregg Elliott Arms, Columbia, MD (US); Audrey Nichole Moore, Stevensville, MD (US)

(73) Assignee: Rampart Communications, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/027,144

(22) Filed: Sep. 21, 2020

(65) Prior Publication Data
US 2021/0006288 A1    Jan. 7, 2021

Related U.S. Application Data

(63) Continuation of application No. 16/690,769, filed on Nov. 21, 2019, now Pat. No. 10,819,387, which is a (Continued)

(51) Int. Cl.
*H04B 1/707* (2011.01)
*H04J 13/16* (2011.01)

(52) U.S. Cl.
CPC .............. *H04B 1/707* (2013.01); *H04J 13/16* (2013.01)

(58) Field of Classification Search
CPC ................................. H04J 13/16; H04B 1/707
See application file for complete search history.

(56) References Cited

U.S. PATENT DOCUMENTS 5,237,587 A * 8/1993 Schoolcraft ............ H04B 1/707
                                                        375/150
5,345,599 A    9/1994 Paulraj et al.
(Continued)

FOREIGN PATENT DOCUMENTS

CN          1813435 A      8/2006
CN        101179539 A      5/2008
(Continued)

OTHER PUBLICATIONS

Huang et al., "Multi-dimensional encryption scheme based on physical layer for fading channel," IET Communications, Oct. 2018, vol. 12, Issue 19, pp. 2470-2477.
(Continued)

*Primary Examiner* — Freshteh N Aghdam
(74) *Attorney, Agent, or Firm* — Cooley LLP

(57) ABSTRACT

Techniques of transmitting wireless communications involve generating orthogonal spreading codes for any number of user devices that are linear combinations of sinusoidal harmonics that match the frequencies within the spread bandwidth. Along these lines, prior to transmitting signals, processing circuitry may generate a set of initial code vectors that form an equiangular tight frame having small cross-correlations. From each of these rows, the processing circuitry produces a new spreading code vector using a code map that is a generalization of a discrete Fourier transform. The difference between the code map and a discrete Fourier transform is that the frequencies of the sinusoidal harmonics are chosen to match the particular frequencies within the spread bandwidth and differ from a center frequency by multiples of the original unspread bandwidth. Different transmitters may then modulate respective signals generated with different spreading code vectors.

20 Claims, 6 Drawing Sheets

Related U.S. Application Data continuation of application No. 16/403,757, filed on May 6, 2019, now Pat. No. 10,491,262, which is a continuation of application No. PCT/US2017/061489, filed on Nov. 14, 2017, which is a continuation of application No. 15/351,428, filed on Nov. 14, 2016, now Pat. No. 10,020,839.

(56) References Cited

U.S. PATENT DOCUMENTS

| | | | |
|---|---|---|---|
| 5,555,268 A * | 9/1996 | Fattouche | H04B 1/707 370/209 |
| 6,389,138 B1 * | 5/2002 | Li | H04B 1/707 370/209 |
| 7,376,173 B2 | 5/2008 | Yedidia et al. | |
| 7,454,084 B2 | 11/2008 | Faber et al. | |
| 9,648,444 B2 * | 5/2017 | Agee | H04W 4/70 |
| 10,020,839 B2 | 7/2018 | Robinson et al. | |
| 10,491,262 B2 | 11/2019 | Robinson et al. | |
| 10,637,705 B1 | 4/2020 | Shattil | |
| 10,735,062 B1 | 8/2020 | Robinson | |
| 10,771,128 B1 | 9/2020 | Sitaram et al. | |
| 10,819,387 B2 | 10/2020 | Robinson et al. | |
| 10,833,749 B1 | 11/2020 | Robinson | |
| 10,873,361 B2 | 12/2020 | Robinson | |
| 2002/0009209 A1 | 1/2002 | Inoue et al. | |
| 2003/0185309 A1 | 10/2003 | Pautler et al. | |
| 2003/0210750 A1 | 11/2003 | Onggosanusi et al. | |
| 2004/0059547 A1 | 3/2004 | Aftelak | |
| 2004/0105489 A1 | 6/2004 | Kim et al. | |
| 2004/0253986 A1 | 12/2004 | Hochwald et al. | |
| 2006/0109897 A1 * | 5/2006 | Guo | H04L 25/03044 375/232 |
| 2006/0274825 A1 | 12/2006 | Cioffi et al. | |
| 2007/0091999 A1 | 4/2007 | Nissan-Cohen et al. | |
| 2007/0098063 A1 | 5/2007 | Reznic et al. | |
| 2007/0115797 A1 | 5/2007 | Reznic et al. | |
| 2009/0046801 A1 | 2/2009 | Pan et al. | |
| 2009/0316802 A1 | 12/2009 | Tong et al. | |
| 2010/0119001 A1 | 5/2010 | Walton et al. | |
| 2010/0202553 A1 | 8/2010 | Kotecha et al. | |
| 2010/0246656 A1 | 9/2010 | Hammerschmidt | |
| 2010/0329393 A1 | 12/2010 | Higuchi | |
| 2011/0134902 A1 | 6/2011 | Ko et al. | |
| 2011/0235728 A1 | 9/2011 | Karabinis | |
| 2012/0093090 A1 | 4/2012 | Han et al. | |
| 2012/0257664 A1 | 10/2012 | Yue et al. | |
| 2013/0064315 A1 | 3/2013 | Heath, Jr. et al. | |
| 2013/0100965 A1 * | 4/2013 | Ohmi | H04J 13/00 370/480 |
| 2013/0223548 A1 | 8/2013 | Kang et al. | |
| 2014/0056332 A1 | 2/2014 | Soualle et al. | |
| 2015/0003500 A1 | 1/2015 | Kesling et al. | |
| 2015/0049713 A1 | 2/2015 | Lan et al. | |
| 2015/0171982 A1 | 6/2015 | Wang et al. | |
| 2015/0304130 A1 | 10/2015 | Logothetis et al. | |
| 2016/0309396 A1 | 10/2016 | Chai et al. | |
| 2016/0337156 A1 | 11/2016 | Milleth et al. | |
| 2017/0180020 A1 | 6/2017 | Namgoong et al. | |
| 2017/0237545 A1 | 8/2017 | Khandani | |
| 2017/0288902 A1 | 10/2017 | Rusek et al. | |
| 2017/0294946 A1 | 10/2017 | Wang et al. | |
| 2017/0302415 A1 | 10/2017 | Park et al. | |
| 2017/0331539 A1 | 11/2017 | Pham et al. | |
| 2019/0075091 A1 | 3/2019 | Shattil et al. | |
| 2019/0097694 A1 | 3/2019 | Jeon et al. | |
| 2019/0158206 A1 | 5/2019 | Li et al. | |
| 2019/0268035 A1 | 8/2019 | Robinson et al. | |
| 2019/0280719 A1 | 9/2019 | Yu | |
| 2019/0349042 A1 | 11/2019 | Ramireddy et al. | |
| 2019/0349045 A1 | 11/2019 | Varatharaajan et al. | |
| 2019/0379430 A1 | 12/2019 | Pekoz et al. | |
| 2020/0014407 A1 | 1/2020 | Smith et al. | |
| 2020/0366333 A1 | 11/2020 | Robinson | |
| 2021/0006303 A1 | 1/2021 | Robinson | |
| 2021/0006317 A1 | 1/2021 | Robinson | |
| 2021/0006446 A1 | 1/2021 | Robinson | |
| 2021/0006451 A1 | 1/2021 | Robinson | |

FOREIGN PATENT DOCUMENTS

| | | |
|---|---|---|
| CN | 101795257 A | 8/2010 |
| CN | 103634065 A | 3/2014 |
| CN | 103716111 A | 4/2014 |
| EP | 1826915 A1 | 8/2007 |
| EP | 1883168 A2 | 1/2008 |
| EP | 3211812 A1 | 8/2017 |
| KR | 10-2010-0131373 A | 12/2010 |
| KR | 10-2013-0118525 A | 10/2013 |
| WO | WO 2008/024773 A2 | 2/2008 |
| WO | WO 2008/098225 A2 | 8/2008 |

OTHER PUBLICATIONS

Huo and Gong, "A New Efficient Physical Layer OFDM Encryption Scheme," IEEE INFOCOM 2014, IEEE Conference on Computer Communications, pp. 1024-1032.

International Search Report and Written Opinion for PCT Application No. PCT/US2017/061489, dated Feb. 26, 2018, 8 pages.

International Search Report and Written Opinion for International Application No. PCT/US2020/040393, dated Sep. 3, 2020, 12 pages.

Liu et al., "Piecewise Chaotic Permutation Method for Physical Layer Security in OFDM-PON," IEEE Photonics Technology Letters, Nov. 2016, vol. 28, No. 21, pp. 2359-2362.

Wu et al., "Practical Physical Layer Security Schemes for MIMO-OFDM Systems Using Precoding Matrix Indices," IEEE Journal on Selected Areas in Communications, Sep. 2013, vol. 31, Issue 9, pp. 1687-1700.

Ericsson, "Signature design for NoMA," 3GPP TSG-RAN WG1 Meeting #93, Tdoc R1-1806241, Busan, South Korea, May 21-25, 2018, pp. 1-5.

International Search Report and Written Opinion for International Application No. PCT/US2020/039879, dated Oct. 9, 2020, 10 pages.

International Search Report and Written Opinion for International Application No. PCT/US2020/039606, dated Nov. 25, 2020, 18 pages.

Invitation to Pay Additional Fees for International Application No. PCT/US2020/039606 dated Sep. 21, 2020, 12 pages.

International Search Report and Written Opinion for International Application No. PCT/US2020/043686, dated Dec. 3, 2020, 24 pages.

Invitation to Pay Additional Fees for International Application No. PCT/US2020/043686 dated Oct. 7, 2020, 16 pages.

Invitation to Pay Additional Fees for International Application No. PCT/US2020/049031 dated Nov. 11, 2020, 13 pages.

Ma et al., "Secure Communication in TDS-OFDM System Using Constellation Rotation and Noise Insertion," IEEE Transactions on Consumer Electronics, Aug. 2010, vol. 56, No. 3, pp. 1328-1332.

Non-Final Office Action for U.S. Appl. No. 16/459,254 dated Nov. 5, 2020, 9 pages.

Huawei, "Initial Performance Evaluation of Multi-user MIMO Scheme for E-UTRA Downlink," 3GPP TSG RAN WG1, R1-051094, San Diego, USA, Oct. 10-14, 2005, 7 pages.

International Search Report and Written Opinion for International Application No. PCT/US2020/051927, dated Jan. 15, 2021, 19 pages.

International Search Report and Written Opinion for International Application No. PCT/US2020/049031, dated Jan. 18, 2021, 20 pages.

Sung et al., "M-Psk Codebook Based Clustered MIMO-OFDM SDMA with Efficient Codebook Search," IEEE, 2012, 5 pages.

Tseng et al., "Hardware Implementation of the Joint Precoding Sub-System and MIMO Detection Preprocessor in IEEE 802.11n/ac WLAN," Journal of Signal Processing Systems (2019) 91:875-884.

(56) References Cited

OTHER PUBLICATIONS

Xie et al., "Geometric Mean Decomposition Based Hybrid Precoding for Millimeter-Wave Massive MIMO," China Communications, May 2018, vol. 15, Issue 5, pp. 229-238.
Zhang et al., "A Novel Precoder Design for MIMO Multicasting with MMSE-DFE Receivers," IEEE, 2014, 5 pages.
Zheng et al., "Performance Comparison on the Different Codebook for SU/MU MIMO," IEEE 802.16 Broadband Wireless Access Working Group, IEEE C802.16m-08/1183r1, Sep. 12, 2008, pp. 1-9.

* cited by examiner

RELIABLE ORTHOGONAL SPREADING CODES IN WIRELESS COMMUNICATION

CROSS-REFERENCE TO RELATED APPLICATION

This application is a continuation of U.S. patent application Ser. No. 16/690,769, filed Nov. 21, 2019 and titled "RELIABLE ORTHOGONAL SPREADING CODES IN WIRELESS COMMUNICATION," which is a continuation of U.S. patent application Ser. No. 16/403,757, filed May 6, 2019 and titled "RELIABLE ORTHOGONAL SPREADING CODES IN WIRELESS COMMUNICATION" (now U.S. Pat. No. 10,491,262), which is a continuation of International Patent Application No. PCT/US2017/061489, filed Nov. 14, 2017 and titled "RELIABLE ORTHOGONAL SPREADING CODES IN WIRELESS COMMUNICATIONS," which claims priority to, and is a continuation of, U.S. Nonprovisional patent application Ser. No. 15/351,428, filed Nov. 14, 2016 and titled "RELIABLE ORTHOGONAL SPREADING CODES IN WIRELESS COMMUNICATIONS" (now U.S. Pat. No. 10,020,839), the disclosures of each of which are incorporated by reference herein in their entireties.

STATEMENT REGARDING FEDERAL GOVERNMENT INTEREST

This United States Government holds a nonexclusive, irrevocable, royalty-free license in the invention with power to grant licenses for all United States Government purposes.

TECHNICAL FIELD

This description relates to systems and methods for transmitting wireless signals for electronic communications and, in particular, to reliable spreading codes used for wireless communications.

BACKGROUND

In multiple access communications, multiple user devices transmit signals over a single communications channel to a receiver. These signals are superimposed, forming a combined signal that propagates over that channel. The receiver then performs a separation operation on the combined signal to recover one or more individual signals from the combined signal. For example, each user device may be a cell phone belonging to a different user and the receiver may be a cell tower. By separating signals transmitted by different user devices, the different user devices may share the same communications channel without interference.

A transmitter may transmit different symbols by varying a state of a carrier or subcarrier, such as by varying an amplitude, phase and/or frequency of the carrier. Each symbol may represent one or more bits. These symbols can each be mapped to a discrete value in the complex plane, thus producing Quadrature Amplitude Modulation, or by assigning each symbol to a discrete frequency, producing Frequency Shift Keying. The symbols are then sampled at the Nyquist rate, which is at least twice the symbol transmission rate. The resulting signal is converted to analog through a digital to analog converter, and then translated up to the carrier frequency for transmission. When different user devices send symbols at the same time over the communications channel, the sine waves represented by those symbols are superimposed to form a combined signal that is received at the receiver.

A conventional approach to produce a multiple access signal involves using Direct Sequence Spread Spectrum (DSSS). In DSSS, each user is provided with a code sequence, which has the customary representation by 0 or 1. This code sequence is subsequently translated to a bipolar sequence, represented by values of 1 and −1. The complex symbols mentioned earlier are then multiplied by this bipolar sequence, and subsequently sampled at the Nyquist rate, converted to analog and translated to the carrier frequency for transmission. The receiver will translate the signal to complex baseband and sample at the Nyquist rate. The receiver is also provided with the code sequence, and multiplies by the bipolar sequence. In this case, a PN code is generated from a deterministically-produced pseudo-random sequence that may be reproduced by the receiver. A bit of the PN code is known as a chip, and is provided at a chip rate that is usually a multiple of the symbol rate of the baseband signal so as to spread the original signal in frequency out to the bandwidth of the chip rate. For the above-described simple case, a user device modulates each signal with the PN code either by applying a phase shift to the signal (i.e., multiplying the signal by −1) or not (i.e., multiplying the signal by +1) at each chip. The combined signal received by the receiver is a superposition of the spread signals sent by each user device at the same time.

In DSSS, the receiver may despread the combined signal it receives and recover signals sent by a particular user device by computing a cross-correlation between a sequence of symbols from the spread signal with the PN code of the particular user device. The result of the cross-correlation is either (i) a large positive or negative number that indicates an original symbol sent by the particular user device at some time or (ii) a small positive or negative number indicating no symbol sent from that user device at that time.

SUMMARY

In many situations, having nonzero cross-correlations complicates the recovery of symbols from any particular user device. Accordingly, it may be advantageous for the PN codes, rather than being formed from a pseudo-random sequence, to instead form an orthogonal basis set. When the PN codes form such an orthogonal basis set, the result of cross-correlating at some time is always small when the particular user device did not send a symbol at that time. By using orthogonal codes, the receiver may recover symbols more easily. An example of codes that form an orthogonal basis set is Walsh codes.

While the above-described conventional approach to wireless communication illustrates how to transmit multiple signals without interference in principle, in practice it is very difficult to generate a set of orthogonal codes for an arbitrary number of user devices. For example, Walsh codes may only be generated for a number of user devices that is a power of two. As a consequence, there may be nonzero correlations between different transmitted signals in the same bandwidth that would result in interference between user devices in a crowded environment.

Further, even if the codes form an orthogonal basis set, there may still be nonzero correlations between different signals in the conventional approach. For example, in DSSS, there is little control over how the symbols are spread by the PN codes. In many instances, the symbols may be spread into non-orthogonal portions of the available bandwidth.

Channel distortions such as caused by interference from signals reflected off obstacles may also render the codes non-orthogonal. This non-orthogonality may result in signal interference between different user devices.

In contrast to the above-described conventional approach to wireless communications in which orthogonal codes are difficult to obtain and control, an improved technique involves generating orthogonal spreading codes for any number of user devices that are linear combinations of sinusoidal harmonics that match the frequencies within the spread bandwidth. Along these lines, prior to transmitting signals, processing circuitry may generate a set of initial code vectors that form an equiangular tight frame having small cross-correlations. From each of these rows, the processing circuitry produces a new spreading code vector using a code map that is a generalization of a discrete Fourier transform. The difference between the code map and a discrete Fourier transform is that the frequencies of the sinusoidal harmonics are chosen to match the particular frequencies within the spread bandwidth and differ from a center frequency by multiples of the original unspread bandwidth. Different transmitters may then modulate respective signals generated with different spreading code vectors.

Advantageously, the improved technique provides orthogonal spreading codes for any number of user devices so as to prevent interference from different user devices within the same communications channel. Specifically, the spreading codes derived according to the improved techniques spread each symbol into orthogonal portions of the available bandwidth. Accordingly, signals spread according to the improved techniques have reliably small cross-correlations and result in no interference between different user devices. The small cross-correlations may even be maintained in the face of channel distortions.

In one general aspect of the improved technique, a method transmitting wireless communications from a signal transmitter to a signal receiver can include generating a plurality of initial vectors, each of the plurality of initial vectors having at least N elements. The method can also include applying a code map to each of the plurality of initial vectors to produce a respective spreading code vector having at least M elements, M being greater than N, the respective spreading code vector being based on that initial vector, the code map being defined so that an inner product of a first spreading code vector based on a first initial vector of the plurality of initial vectors and a second spreading code vector based on a second initial vector of the plurality of initial vectors is equal to a product of (i) an inner product of the first initial vector and the second initial vector (ii) a positive constant. The method can further include performing a spreading operation on a first signal with the first spreading code vector to produce a first spread signal and a second signal with the second spreading code vector to produce a second spread signal, each of the first spread signal and the second spread signal having at least M elements. The method can further include combining the first and second spread signals into a combined spread signal which is received at a signal receiver that is configured to perform a despreading operation on the combined spread signal with the first spreading code vector and the second spreading code vector, producing the first signal and the second signal at the signal receiver.

The details of one or more implementations are set forth in the accompanying drawings and the description below. Other features will be apparent from the description and drawings, and from the claims.

DETAILED DESCRIPTION

Figure 1:
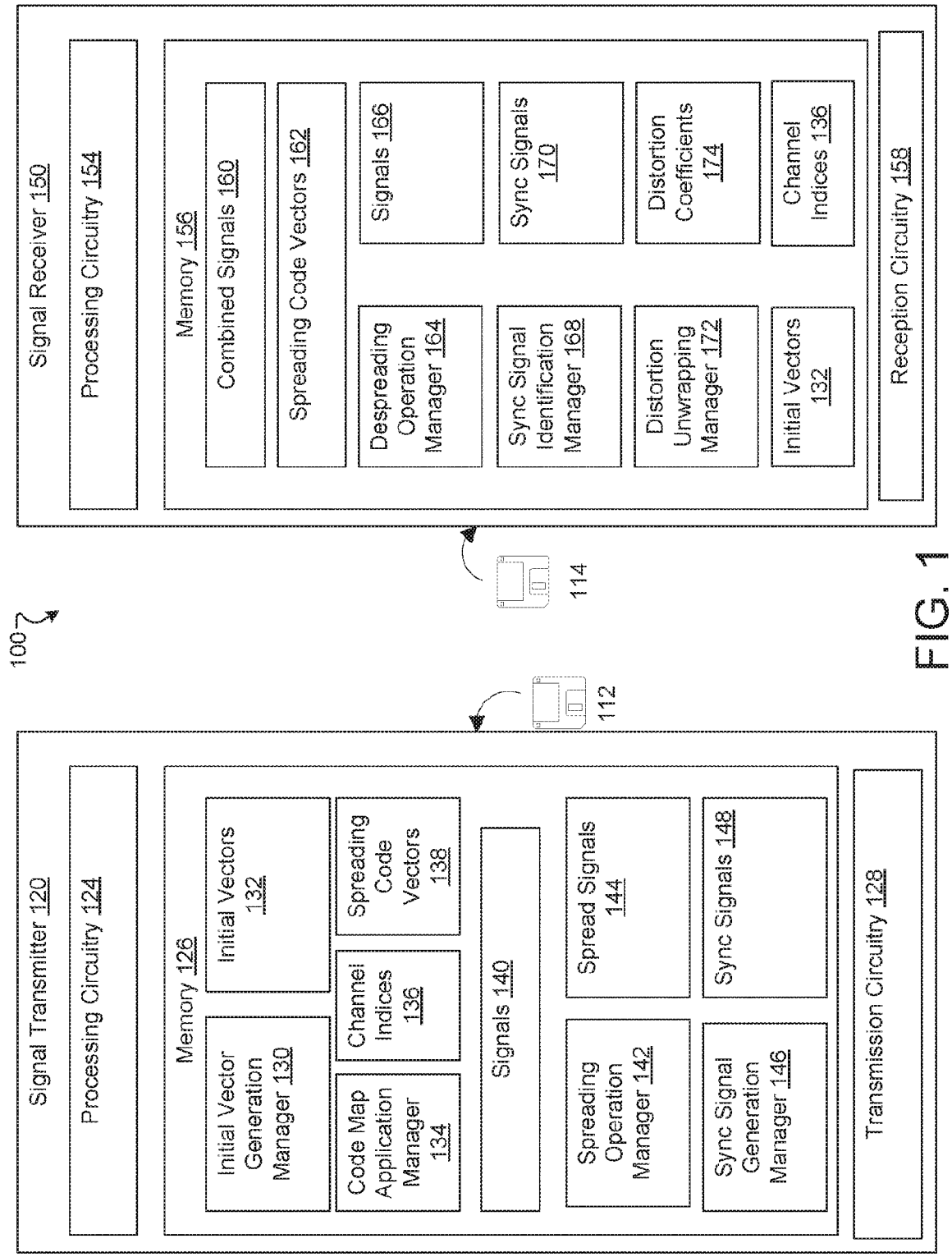
FIG. 1 is a block diagram illustrating an example electronic communications system within an electronic environment in which improved techniques described herein may be performed.

An improved technique involves generating orthogonal spreading codes for any number of user devices that are linear combinations of sinusoidal harmonics that match the frequencies within the spread bandwidth. Along these lines, prior to transmitting signals, processing circuitry may generate a set of initial code vectors that form an equiangular tight frame having small cross-correlations. From each of these rows, the processing circuitry produces a new spreading code vector using a code map that is a generalization of a discrete Fourier transform. The difference between the code map and a discrete Fourier transform is that the frequencies of the sinusoidal harmonics are chosen to match the particular frequencies within the spread bandwidth and differ from a center frequency by multiples of the original unspread bandwidth. Different transmitters may then modulate respective signals generated with different spreading code vectors.

For example, consider an environment in which N transmitters communicate with a signal receiver. Processing circuitry of a signal transmitter may generate K initial code vectors of length N, or a K×N matrix. When K=N, the matrix is unitary (i.e., the inverse of the matrix is equal to the complex conjugate of the transpose of the matrix), and the rows of the unitary matrix form an orthonormal basis set over $\mathbb{C}^N$, where $\mathbb{C}$ is the field of complex numbers. Otherwise, when K>N, the rows of the matrix form a nearly equiangular tight frame whose inner products are bounded by the Welch bound.

Along these lines, the above-described code map can be a function $\bar{c}\colon \mathbb{C}^N \to \mathbb{C}^M$ for M>N (i.e., it maps a vector of length N to a vector of length M) of the initial code vectors as follows:

$$[\bar{c}(v)]_m = \sum_{n=1}^{N} v_n \exp\left[-i2\pi\kappa_n\left(\frac{m}{M} - \frac{1}{2}\right)\right],$$

where $\bar{v}$ is a row of the unitary matrix, $m \in \{0, 1, \ldots, M-1\}$, and $\kappa_n$ is a frequency corresponding to a multiple of the original bandwidth. Thus, each row of the K×N matrix representing the initial code vectors is mapped to a set of K spread code vectors, each of length M. The code map $\bar{c}$ preserves inner products up to a constant, i.e., $\bar{c}(\bar{v})^* \cdot \bar{c}(\bar{w}) = M \bar{v}^* \cdot \bar{w}$ for two vectors $\bar{v}$ and $\bar{w}$. Thus, when the initial code vectors form an orthonormal basis set over $\mathbb{C}^N$, the code map produces a set of spreading codes that form an orthogonal basis over $\mathbb{C}^M$.

Further, it should be appreciated that the $\kappa_n$ can correspond to the various frequency bands of the available spread spectrum. Thus, the code map "chips" the original digital baseband signal by spreading it over the available frequency bands. Because the spread symbols are constructed from a unitary matrix whose columns as well as rows form an orthonormal basis over $\mathbb{C}^N$, the spread symbols within each frequency band maintain their orthogonality. Thus, there is no in-band signal interference that may result in non-zero correlations at the receiver.

FIG. 1 is a diagram that illustrates an example system 100 in which improved techniques of transmitting wireless communications are performed. The system 100 includes a signal transmitter 120 and a signal receiver 130. It should be appreciated, however, that there may be other signal transmitters not pictured within the environment.

The signal transmitter 120 is configured to prepare signals for transmission to the signal receiver 150 and to transmit the prepared signals to the signal receiver 150. The signal transmitter 120 includes processing circuitry units 124, memory 126, and transmission circuitry unit 128. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein. The transmission circuitry 128 is configured to transmit signals in the form of radio-frequency energy to the receiver.

In some embodiments, one or more of the components of the signal transmitter 120 can be, or can include, processors (e.g., processing units 124) configured to process instructions stored in the memory 126. Examples of such instructions as depicted in FIG. 1 include an initial vector generation manager 130, a code map application manager 134, a spreading operation manager 142, and a sync signal generation manager 146. Further, as illustrated in FIG. 1, the memory 126 is configured to store various data, which is described with respect to the respective managers that use such data.

The initial vector generation manager 130 is configured to produce a set of initial vectors 132 from which spreading code vectors 138 may be derived. As an example, in some implementations the initial vectors 132 are the rows of a K×N matrix. In this case, the initial vector generation manager 130 is configured to produce such a matrix based on a specification of the integer N, which represents a number of available discrete frequencies by which a signal may be modulated. These may be determined by the coherence bandwidth of the channel, which represents the multipath delay profile expected.

It should be appreciated that, while the initial vectors 132 provide a nearly orthogonal, or orthogonal, set of codes by which signals may be spread, the initial vectors 132 are not directly used to modulate these signals. A reason for this is that the initial vectors 132 do not preserve orthogonality within each frequency band of the spread spectrum. Accordingly, a combined signal generated from the initial vectors 132 may not preserve orthogonality at the signal receiver 150 in the face of temporal delays between signal transmissions.

Along these lines, the code map application manager 134 is configured to generate K spreading code vectors 138 from the K initial vectors 132. As stated above, each of the spreading code vectors 138 has a length M>N and the code map is a map $\bar{c}: \mathbb{C}^N \to \mathbb{C}^M$. Again, the code map is $$[\bar{c}(v)]_m = \sum_{n=1}^{N} v_n \exp\left[-i 2\pi \kappa_n \left(\frac{m}{M} - \frac{1}{2}\right)\right], \quad (1)$$

where $m \in \{0, 1, \ldots, M-1\}$, $\bar{v} \in \mathbb{C}^N$. The channel indices 136 $\kappa_n$ and $\kappa_n$ represent frequencies corresponding to a multiple of the original bandwidth i.e., if the communications channel has a bandwidth B, then a frequency partition will be centered at $\kappa_n B$. In one implementation, $\kappa_n = n$. In another implementation, $$\kappa_n = n - \left\lfloor \frac{N}{2} \right\rfloor.$$

Thus, each row of the K×N matrix representing the initial code vectors is mapped to a set of K spread code vectors, each of length M.

Further, it should be appreciated that the $\kappa_n$ can correspond to the various frequency bands of the available spread spectrum. Thus, the code map $\bar{c}$ also maps each spread symbol within a particular chip to its own frequency band. Because the spread symbols are constructed from a unitary matrix whose columns as well as rows form an orthonormal basis over $\mathbb{C}^N$, the spread symbols within each frequency band maintain their near-orthogonality or orthogonality. Thus, there is no in-band signal interference that may result in non-zero correlations at the receiver.

In some further implementations, the value of M may be determined from the channel indices 136. Along these lines, a lower bound of M is given by the expression 2

$$\max_n |\kappa_n|.$$

In this way, the criterion M>N is satisfied.

The code map $\bar{c}$ as defined above satisfies the following result. Let $\bar{v} \in \mathbb{C}^N$ and $\bar{w} \in \mathbb{C}^N$. Then if · denotes an inner product operation, then $$\bar{c}(\bar{v})^* \cdot \bar{c}(\bar{w}) = M \bar{v}^* \cdot \bar{w}. \quad (2)$$

Eq. (2) may be derived directly from the above-described definition of the code map $\bar{c}$ in Eq. (1). Thus, as stated above, the code map $\bar{c}$ preserves inner products to within a constant. Specifically, when the initial code vectors $\bar{v}$ and $\bar{w}$ are orthogonal, the resulting spreading code vectors $\bar{c}(\bar{v})$ and $\bar{c}(\bar{w})$ are also orthogonal. It should be noted that herein the inner product may be taken to be a standard dot product with respect to a Euclidean metric. However, generally speaking, this need not be the case.

In this way, when the initial code vectors 132 are taken from the rows of a K×N matrix A, then the spreading code vectors 138 are given by $\bar{c}(\overline{A_k})$, where $k \in \{1, 2, \ldots, K\}$ and $\overline{A}_k$ is the $k^{th}$ row of A. It should be noted that, in some implementations, the initial code vectors 132 may be taken from the columns of A.

The spreading operation manager 142 is configured to generate spread signals 144 from original, unencoded communications signals 140 with the spreading code vectors 138. Note that a signal 140 may contain any number of symbols to be recovered at the signal receiver 150 For example, the spread signals 144 may be generated from the signals 140 and the spreading code vectors 138 as follows:

$$\vec{s}' = \sum_{k=1}^{K} \overline{c}(\overline{A}_k)s_k, \qquad (3)$$

where $\vec{s}'$ is a spread signal 144 and $s_k$ is a digital complex baseband symbol of a signal 140. Note that, physically, each of the symbols may take the value of +1 or −1 in FSK (or a complex constellation value in QAM) and represents a sine wave to be modulated by the spreading code vectors 138. It is the spread signals 144 that are transmitted to the signal receiver 150 by the transmission circuitry 128.

In some implementations, the spread signals 144 experience channel distortion during transmission from the signal transmitter 120 and the signal receiver 150. An example of channel distortion is a power imbalance between the channels of the spread spectrum due to, e.g., signal reflections off of obstacles. In order to identify the channel distortion so that the original signals may be recovered at the signal receiver 150, the sync signal generation manager 146 is configured to generate sync signals 148 and to send the sync signals 148 to the signal receiver 150.

The sync signals 148 are training symbols used to deduce channel distortion coefficients. The signal receiver 150 may deduce these coefficients by comparing the distortion experienced by the sync signals 148 through the spread spectrum channels to the original sync signals 148. In either case, the signal receiver 150 has a copy of the sync signals 148 stored locally. In some arrangements, the sync signal generation manager 146 prepends a sync signal 148 to a spread signal 144 in order to compensate for channel distortion as the signal is despread.

The signal receiver 150 is configured to receive signals from the signal transmitter 120 and to perform operations on the received signals to recover the original signals 140. The signal receiver 150 includes processing circuitry 154, memory 156, and reception circuitry 158. The set of processing units 154 include one or more processing chips and/or assemblies. The memory 156 includes both volatile memory (e.g., RAM) and non-volatile memory, such as one or more ROMs, disk drives, solid state drives, and the like. The set of processing units 154 and the memory 156 together form control circuitry, which is configured and arranged to carry out various methods and functions as described herein. The reception circuitry 158 is configured to receive modulated signals in the form of radio-frequency energy from the signal transmitter 120.

In some embodiments, one or more of the components of the signal receiver 150 can be, or can include, processors (e.g., processing units 154) configured to process instructions stored in the memory 156. Examples of such instructions as depicted in FIG. 1 include a despreading operation manager 164, a sync signal identification manager 168, and a distortion unwrapping manager 172. Further, as illustrated in FIG. 1, the memory 156 is configured to store various data, which is described with respect to the respective managers that use such data.

The despreading operation manager 164 is configured to perform despreading operations on received, combined signals 160 with spreading code vectors 162 to produce signals 166. It should be understood that, without any channel distortion, the combined signals 160 are simply the spread signals 144 sent in a stream and altogether from the signal transmitter 120, while the spreading code vectors 162 are equivalent to the spreading code vectors 138. In this case, the despreading operation manager 164 generates inner products of the combined signals 160 with the spreading code vectors 162 to recover the original symbols of the signals 140. Because the spreading codes preserved orthogonality within each frequency band, the original symbols of the signals 140 may be reliably recovered even in the face of minor delays between different transmitters.

In some implementations, the effects of channel distortion caused by multipath interference can be counteracted. This can be accomplished through design of the spacing of the discrete frequency components $\kappa_n$ to be such that they are less than the channel coherence bandwidth. Channel coherence bandwidth is typically the reciprocal of the Root Mean Square (RMS) delay spread of the channel, the delay spread being the distribution in time of the multipath delays.

In addition, the signal transmitter 120 prepends each spreading vector 138. For example, when the signal transmitter 120 prepends each spreading code vector 138 with a number L of its final components as a cyclic prefix, the channel distortion may be modeled as a single distortion coefficient $h_n$ per discrete frequency value, where again $n \in \{1, 2, \ldots, N\}$ and $h_n$ is a component of a distortion vector $\overline{h}$. The effect of this channel distortion is to modify the symbols of the spread signal 144 differently based on the frequency band of those symbols. For example, suppose that the initial vectors 132 are the rows of a K×N matrix A. Then, because the channel distortion value is a function of the frequency band, the effect of the channel distortion may be modeled by multiplying each column of A with a respective distortion coefficient. This mathematical operation may model, for example, the imbalance in energy from each transmitter resulting from reflections off obstacles.

If the $n^{th}$ column of A represents a particular frequency band, then the channel distortion is modeled by multiplying the $n^{th}$ column of A by $h_n$. This operation is represented as a Hadamard product $\overline{A}_k \circ \overline{h}$ of a row of A (i.e., $\overline{A}_k$) and the distortion vector $\overline{h}$. The despreading operation manager 164 will not be able to recover the original signals 140 without adjusting the spreading code vectors 162. This adjustment may be effected using sync signals 148 sent by the signal transmitter 120.

The sync signal identification manager 168 is configured to identify sync signals 170 within the combined signals 160. This identification may be accomplished by applying a finite impulse response (FIR) filter to components of the combined spread signal 160. This FIR filter typically takes the form of a sliding dot product with the spreading code vectors 162, with the sliding dot product varying over the signal in time. Thus, the FIR filter provides cross-correlations that identify the sync signals 148 from the combined signals 160.

The distortion unwrapping manager 172 is configured to determine the value of the distortion coefficients 174 $h_n$ based on the sync signals 170, denoted as $\overline{b}'$. It is appreciated that the sync signal $\overline{b}'$ may be expressed in terms of the undistorted sync signal 148, denoted as $\overline{b}$, as follows:

$$\overline{b}' = \sum_{k=1}^{K} b_k \overline{c}(\overline{A}_k \circ \overline{h}). \quad (4)$$

In the case of the initial vectors 132 being a K×N matrix A, it may be shown that the distortion coefficients take the value $$h_n = \frac{\overline{c}(\overline{e}_n)^* \cdot \overline{b}'}{M \sum_{k=1}^{K} b_k A_{kn}}, \quad (5)$$

where $\overline{e}_n$ is the unit vector along the $n^{th}$ coordinate axis (e.g., $\overline{e}_1 = (1, 0, \ldots, 0)$, $\overline{e}_2 = (0, 1, 0, \ldots, 0)$, and so on) and $A_{kn}$ is an element of the matrix A.

The distortion unwrapping manager 172 is also configured to adjust the values of the spreading code vectors 162 in order that the despreading operation manager 164 may recover the original signals 166 from the combined signal 160. The recovery is performed as follows. Let $$\overline{h}' = \left(\frac{1}{h_1^*}, \frac{1}{h_2^*}, \ldots, \frac{1}{h_N^*}\right). \quad (6)$$

Then the $n^{th}$ component of the original signal 140 $\overline{s}$ is derived from the distorted signal $\overline{s}'$:

$$s_n = \frac{1}{M} \overline{c}(\overline{A}_n \circ \overline{h}') \cdot \overline{s}'. \quad (7)$$

It should be appreciated that the sync identification manager 168 can perform the identification of the sync signals in a single operation with the distortion unwrapping, as well as any removal of L cyclic prefixes from the combined signal 160. This is in contrast to conventional techniques in which such operations are performed as separate steps.

It should also be appreciated that the signal receiver 150 may also store the initial vectors 132 and the channel indices 136. This data may be used in computing the quantities in Eqs. (5), (6), and (7).

In some implementations, the memory 126 and 156 can be any type of memory such as a random-access memory, a disk drive memory, flash memory, and/or so forth. In some implementations, the memory 126 and 156 can be implemented as more than one memory component (e.g., more than one RAM component or disk drive memory) associated with the components of the signal transmitter 120 and the signal receiver 150. In some implementations, the memory 126 can be a database memory. In some implementations, the memory 126 and 156 can be, or can include, a non-local memory. For example, the memory 126 can be, or can include, a memory shared by multiple devices (not shown). In some implementations, the memory 126 and 156 can be associated with a server device (not shown) within a network and configured to serve the components of the signal transmitter 120 and the signal receiver 150.

The components (e.g., modules, processing units 124 and 154) of the signal transmitter 120 and signal receiver 150 can be configured to operate based on one or more platforms (e.g., one or more similar or different platforms) that can include one or more types of hardware, software, firmware, operating systems, runtime libraries, and/or so forth. In some implementations, the components of the signal transmitter 120 and signal receiver 150 can be configured to operate within a cluster of devices (e.g., a server farm). In such an implementation, the functionality and processing of the components of the signal transmitter 120 and signal receiver 150 can be distributed to several devices of the cluster of devices.

The components of the signal transmitter 120 and signal receiver 150 can be, or can include, any type of hardware and/or software configured to process attributes. In some implementations, one or more portions of the components shown in the components of the signal transmitter 120 and signal receiver 150 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the signal transmitter 120 and signal receiver 150 can be, or can include, a software module configured for execution by at least one processor (not shown). In some implementations, the functionality of the components can be included in different modules and/or different components than those shown in FIG. 1.

Although not shown, in some implementations, the components of the signal transmitter 120 and signal receiver 150 (or portions thereof) can be configured to operate within, for example, a data center (e.g., a cloud computing environment), a computer system, one or more server/host devices, and/or so forth. In some implementations, the components of the signal transmitter 120 and signal receiver 150 (or portions thereof) can be configured to operate within a network. Thus, the components of the signal transmitter 120 and signal receiver 150 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the signal transmitter 120 can be, or can include, processors configured to process instructions stored in a memory. For example, the initial vector generation manager 130 (and/or a portion thereof), the code map application manager 134 (and/or a portion thereof), the spreading operation manager 142 (and/or a portion thereof), the sync signal generation manager 146 (and/or a portion thereof), the despreading operation manager 164 (and/or a portion thereof), the sync signal identification manager 168 (and/or a portion thereof), and the distortion unwrapping manager 172 (and/or a portion thereof) can be a combination of a processor and a memory configured to execute instructions related to a process to implement one or more functions.

It should also be appreciated that even though the above example included a signal transmitter 120 that performed the above-described improved techniques, in other implementations these techniques may be performed on a computer external to any of the signal transmitters within the electronic environment 100.

Figure 2:
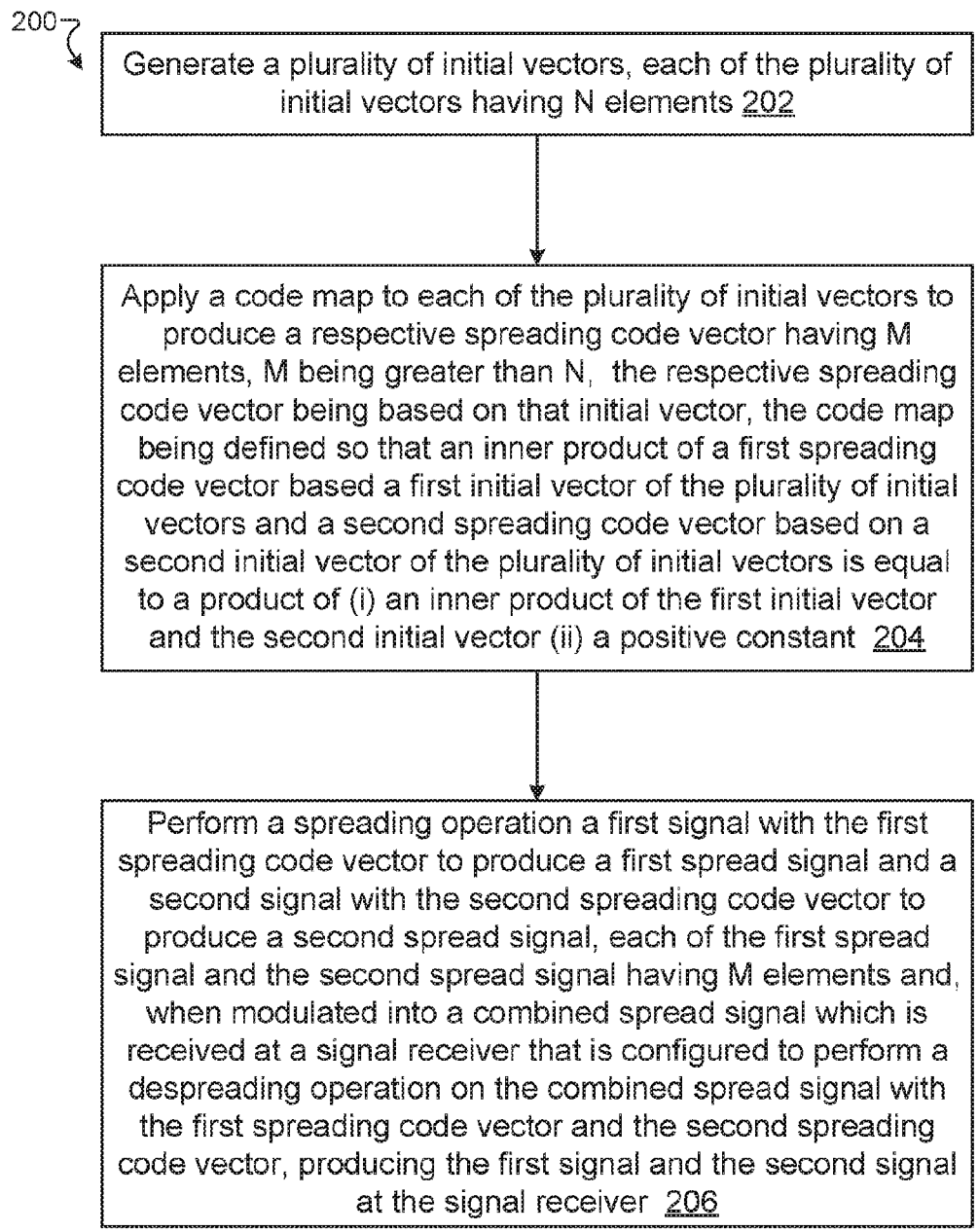
FIG. 2 is a flowchart illustrating an example method for transmitting wireless communications according to the improved techniques described herein.

FIG. 2 is a flow chart that illustrates an example method 200 of transmitting wireless communications. The method 200 may be performed by software constructs described in connection with FIG. 1, which reside in memory 126 and 156 of the signal transmitter 120 and signal receiver 150 and are run by the set of processing units 124 and 154.

At 202, the signal transmitter 120 generates a plurality of initial vectors. Each of the plurality of initial vectors has N elements.

At 204, the signal transmitter 120 applies a code map to each of the plurality of initial vectors to produce a respective spreading code vector having M elements, M being greater than N. The respective spreading code vector is based on that initial vector. The code map is defined so that an inner product of a first spreading code vector based a first initial vector of the plurality of initial vectors and a second spreading code vector based on a second initial vector of the plurality of initial vectors is equal to a product of (i) an inner product of the first initial vector and the second initial vector and (ii) a positive constant.

At 206, the signal transmitter performs a spreading operation a first signal with the first spreading code vector to produce a first spread signal and a second signal with the second spreading code vector to produce a second spread signal. Each of the first spread signal and the second spread signal has M elements and, when received together as a combined spread signal at a signal receiver that is configured to perform a despreading operation on the combined spread signal with the first spreading code vector and the second spreading code vector, produces the first signal and the second signal at the signal receiver.

Figure 3:
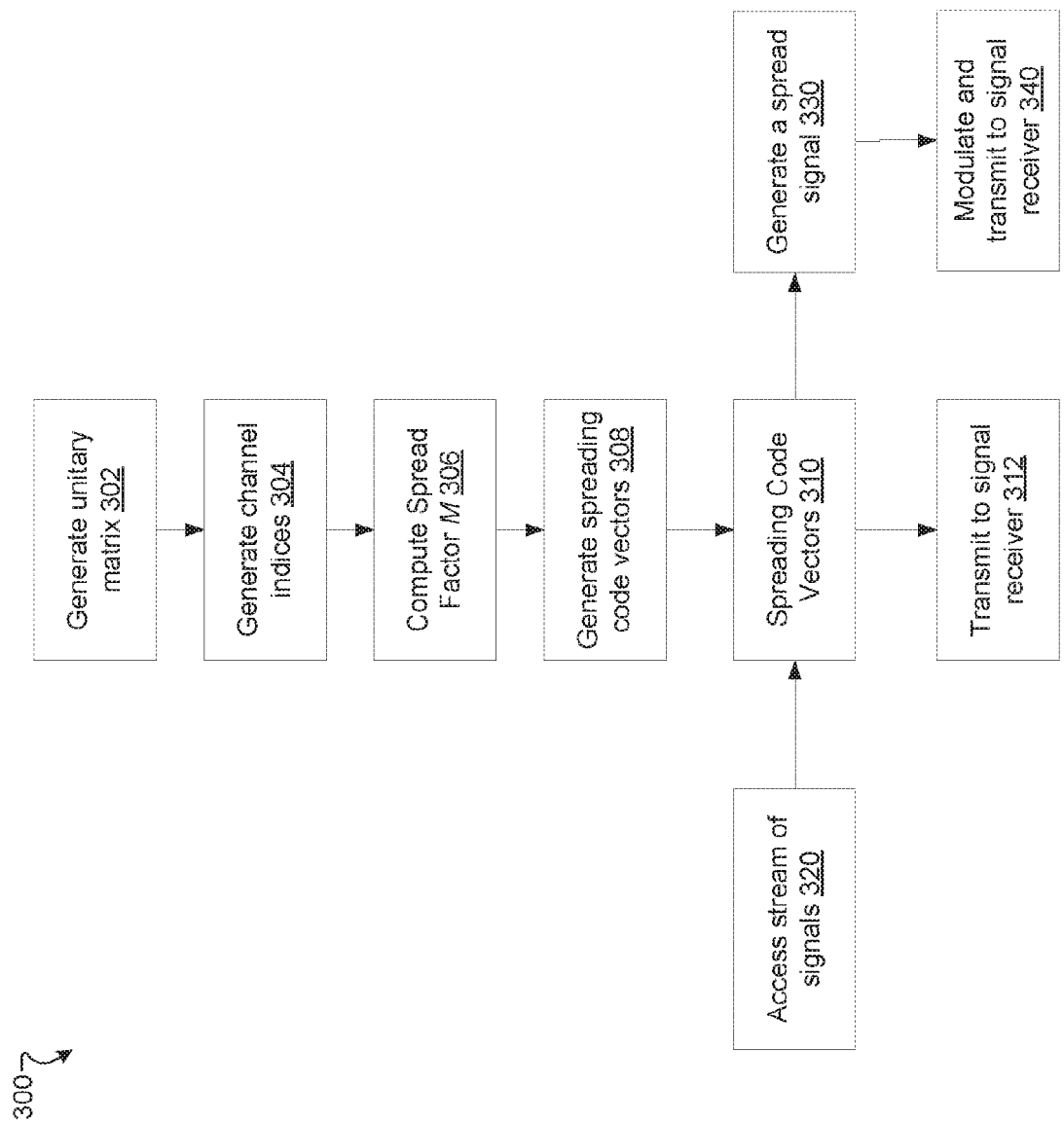
FIG. 3 is a flowchart illustrating an example process of generating and transmitting spread signals at a signal transmitter according to the improved techniques.

FIG. 3 illustrates an example process 300 of generating and transmitting spread signals at the signal transmitter 120. The process 300 may be performed by software constructs described in connection with FIG. 1, which reside in memory 126 of the signal transmitter 120 and are run by the set of processing units 124.

At 302, the signal transmitter 120 generates a K×N matrix A. As discussed previously, the rows of such a matrix may form a nearly equiangular tight frame.

At 304, the signal transmitter 120 generates channel indices $\kappa_n$. The channel indices $\kappa_n$ represent a multiple of the bandwidth of signals being accessed or multiplexed at the signal transmitter 120. In an example, the channel indices $\kappa_n$ are sequential integers.

At 306, the signal transmitter 120 computes M as a spread factor based on the maximum of the channel indices. The larger the value of M, the more computation is necessary to manipulate the spread signals, so that ideally M may be close in value to its lower bound.

At 308, the signal transmitter 120 generates spreading code vectors 310 according to Eq.

(1) based on the value of M, the channel indices, and the K×N matrix A.

At 312, the signal transmitter 120 transmits the spreading code vectors 310 to the signal receiver At 320, the signal transmitter 120 accesses a stream of signals that are to be transmitted to the signal receiver 150. For example, the signal transmitter 120 may be included in a cellular phone and the signals being accessed are digitized voice signals. Each signal may simply be represented as single symbol, e.g., a bit or a bit string, as is the case in binary phase-shift keys (BPSK) or a QAM constellation.

At 330, the signal transmitter 120 generates a spread signal from the stream of signals using the spreading code vectors 310. This generation is performed according to Eq.

(3) and results in a spread signal of length M.

At 340, the signal transmitter 120 transmits the spread signal (or multiple spread signals) to the signal receiver 150.

Figure 4:
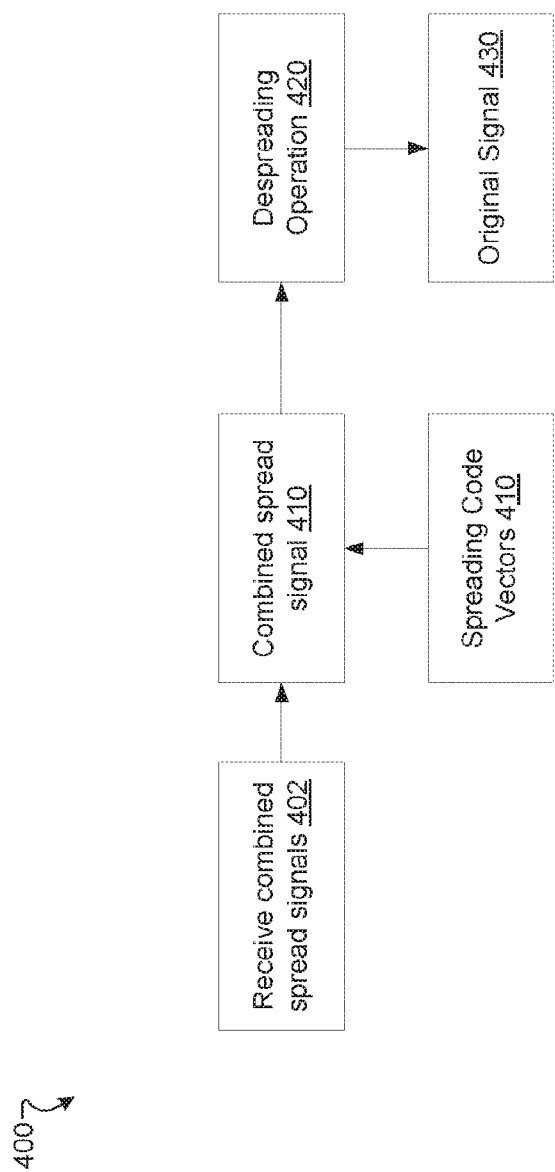
FIG. 4 is a flowchart illustrating an example process of recovering signals at a signal receiver according to the improved techniques.

FIG. 4 illustrates an example process 400 of recovering signals at the signal receiver 150. The process 400 may be performed by software constructs described in connection with FIG. 1, which reside in memory 156 of the signal receiver 150 and are run by the set of processing units 154.

At 402, the signal receiver 150 receives spread signals from the signal transmitter 120 as a combined spread signal 410.

At 420, the signal receiver 150 performs a despreading operation on the combined spread signal 410 using the spreading code vectors 410 to recover the original signals 430. The despreading operation can be performed as a FIR filter, specifically by computing an inner product of a spreading code vector 410 and shifts of the spread signal 410.

FIG. 3 and FIG. 4 illustrate processes for transmitting and recovering signals in distortion-free environments. However, the above-described signal transmitter 120 and signal receiver 150 are adapted to transmit and recover signals in the presence of channel distortion. A process that accomplishes such a recovery is described with reference to FIG. 5.

Figure 5:
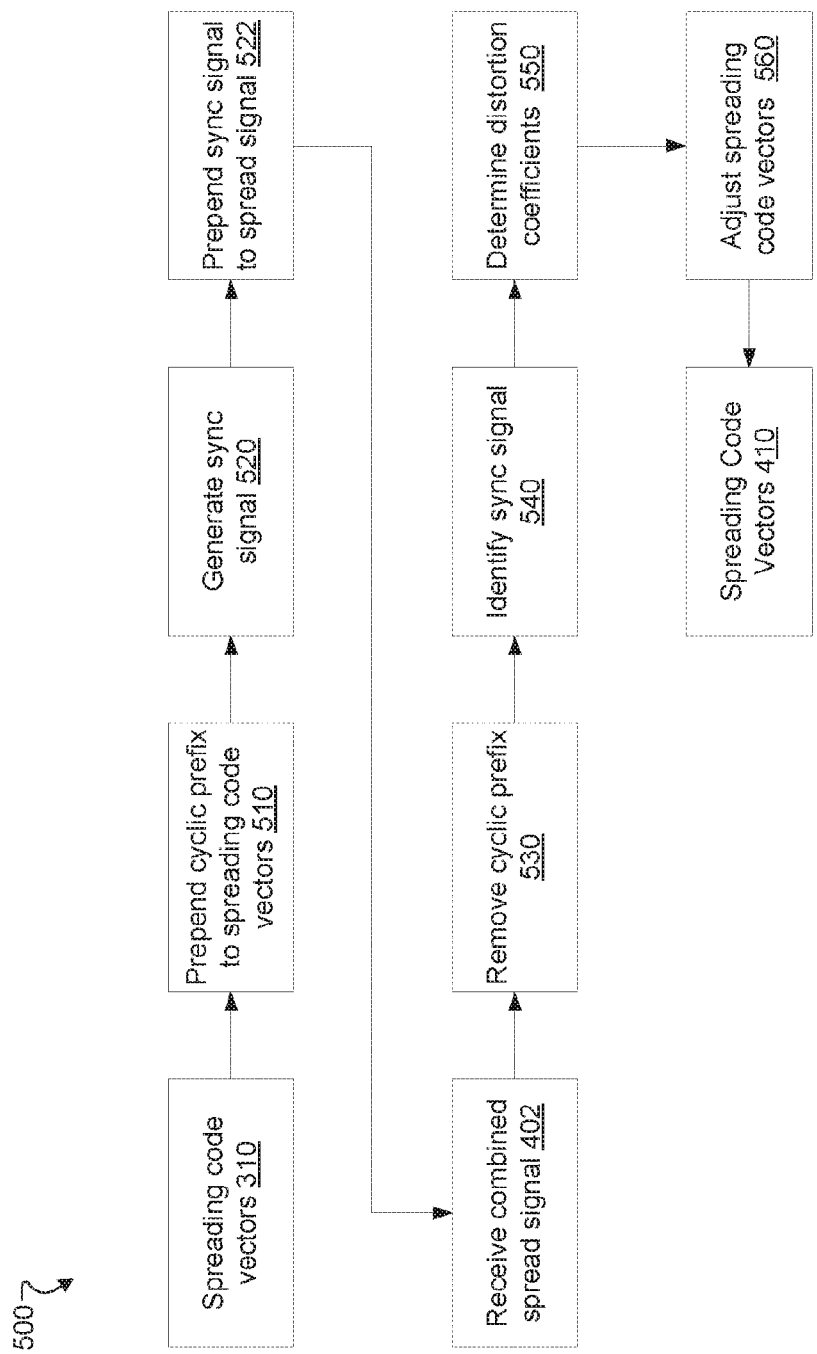
FIG. 5 is a flowchart illustrating an example process of correcting for channel distortion at the signal transmitter and signal receiver according to the improved techniques.

FIG. 5 illustrates an example process 500 of correcting transmitted signals for channel distortion at the signal transmitter 120 and signal receiver 150. The process 500 may be performed by software constructs described in connection with FIG. 1, which reside in memory 126 and 156 of the signal transmitter 120 and signal receiver 150 and are run by the set of processing units 124 and 154.

At 510, the signal transmitter 120 prepends a cyclic prefix of length L onto spreading code vectors 310. The cyclic prefix is useful for equalization, or correcting channel distortion as it allows for efficient circular convolution of the received signal with the channel. Prepending the cyclic prefix onto the spreading code vectors produces a large gain in computational speed at the signal transmitter 120 over the conventional technique of prepending signals because the prepending need only be done once per spreading code vector. Here, when the signal transmitter 120 applied the spreading code vector to the signals, the resulting spread signals automatically acquire a cyclic prefix.

At 520, the signal transmitter 120 generates a sync signal of length M separate from the spread signals. The symbols, or components, of the sync signal are different from those of the spread signals. At 522, the signal transmitter prepends the sync signal onto the spread signals to produce a single data block as the combined spread signal received at the signal receiver 150. Note that the combined signal also includes the cyclic prefix.

At 530, the signal receiver 150 removes the cyclic prefix from the received combined spread signal 402. The signal receiver 150 can perform the removal by prepending L zeroes onto the spreading code vectors 410 and implementing the resulting prepended codes as a FIR filter.

At 540, the signal receiver 150 identifies the sync signal as embedded within the combined spread signal 402. In some implementations, this identification may be performed simultaneously with the removal of the cyclic prefix using the FIR filter.

At 550, the signal receiver 150 uses the identified sync signal and the K×N matrix A to determine the distortion coefficients $h_m$. The determination of the distortion coefficients $h_m$ is performed according to Eq. (5).

At 560, the signal receiver 150 performs equalization by adjusting the spreading code vectors 410 based on the determined distortion coefficients $h_m$. This equalization is performed according to Eq. (6) and Eq. (7). The recovery of the original signals is performed according to Eq. (7).

Figure 6:
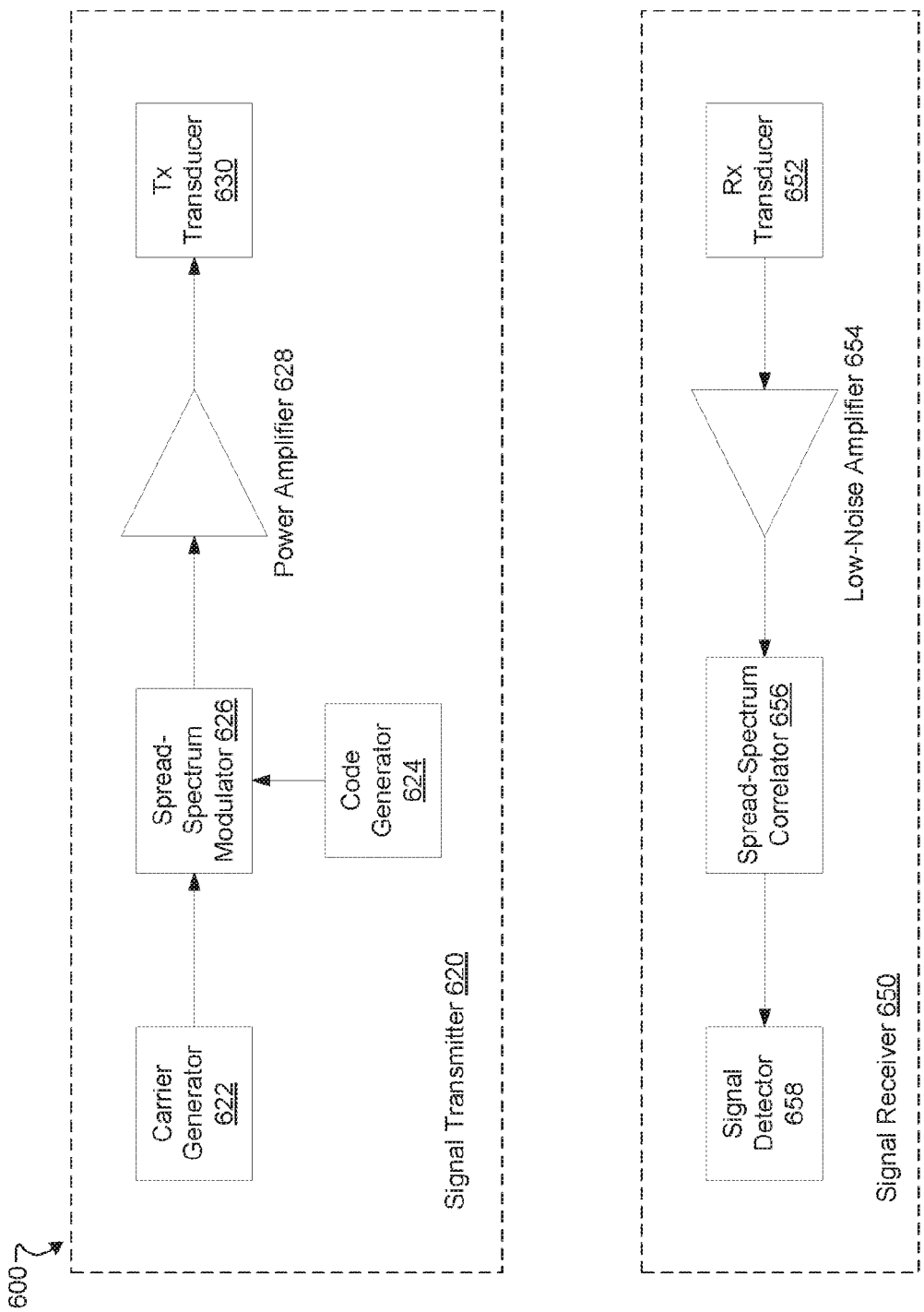
FIG. 6 is a block diagram of an example electronics communications system according to another embodiment of the improved techniques described herein.

FIG. 6 illustrates an example communications system 600 according to another embodiment of the improved techniques. The communications system 600 includes a signal transmitter 620 and a signal receiver 650.

The signal transmitter 620 is configured to generate signals representing communications, modulate the signals into electromagnetic waves, and transmit the electromagnetic waves to the signal receiver 650. For example, the signal transmitter 620 may take the form of a cellular telephone that transmits voice and/or data communications to a cell tower. The signal transmitter 620 includes a carrier generator 622, a code generator 624, a spread-spectrum modulator 626, a power amplifier 628, and a transmission transducer 630.

The carrier generator 622 is configured to produce carrier sinusoidal signals at a center frequency within a certain bandwidth. Here, the spread spectrum modulator 626 performs the task of spreading the digital complex baseband symbols using the spreading code, as well as employing the carrier generator signal 622 to translate the resulting spread signal up to the carrier frequency The carrier generator 622 may take the form of special-purpose logic circuitry. The signals may be represented as digital complex baseband symbols, e.g., binary phase-shift keying (BPSK) or quadrature amplitude modulation (QAM) symbols.

The code generator 624 produces spread-spectrum codes such as those described above in Eq.

(1). The code generator 624 may take the form of special-purpose logic circuitry.

The spread-spectrum modulator 626 is configured to modulate the carrier signals using the spread-spectrum codes to produce a set of spread signals within a wide band. Each of the set of spread signals is transmitted within a frequency band, or channel, that is centered at a multiple of the bandwidth of the original carrier signals. The multiples are specified by the channel indices described above.

The power amplifier 628 is configured to increase the power of the spread signals produced by the modulator 626. The transmission transducer 630 converts the various channels within which the spread-spectrum signals are produced into electromagnetic energy for propagation to the signal receiver 650. The power amplifier 628 may drive the transmission transducer 630 and operate up to the continuous wave (CW) power limit of the transmission transducer 630.

The signal receiver 650 is configured to receive electromagnetic energy propagated from the signal transmitter 620, correlate the spread-spectrum signals carried within the electromagnetic energy, and detect original signals produced by the signal transmitter 620. For example, the signal receiver 650 may take the form of a cell tower that receives cell phone signals and re-transmits the signals to target cellular telephones. The signal receiver 650 includes a receiving transducer 652, a low-noise amplifier 654, a spread-spectrum correlator 656, and a signal detector 658.

The receiving transducer 652 is configured to receive the electromagnetic energy produced by the transmitting transducer 630 and generate signals from the electromagnetic energy. The low-noise amplifier 654 is configured to receive and amplify the signals generated by the receiving transducer 652.

The spread-spectrum correlator 656 is configured to despread the signal amplified by the low-power amplifier 654. The spread-spectrum correlator 656 applies the codes generated by the code generator 624 to the received signals to produce signals at the original carrier frequency. The signal detector 658 then detects and processes these signals at the original carrier frequency.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device (computer-readable medium, a non-transitory computer-readable storage medium, a tangible computer-readable storage medium, see for example, media 112 and 114 in FIG. 1) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a liquid crystal display (LCD or LED) monitor, a touchscreen display, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
generating, via at least one processor, a plurality of initial vectors;
applying, via the at least one processor, a code map to each initial vector from the plurality of initial vectors to produce an associated spreading code vector from a plurality of spreading code vectors, the code map defined such that an inner product of: (1) a first spreading code vector from the plurality of spreading code vectors, based on a first initial vector from the plurality of initial vectors; and (2) a second spreading code vector from the plurality of spreading code vectors, based on a second initial vector from the plurality of initial vectors, is equal to a product of (i) an inner product of the first initial vector and the second initial vector, and (ii) a positive constant; and
generating, via the at least one processor, at least one of:
a first spread signal based on a first baseband signal and the first spreading code vector; or
a second spread signal based on a second baseband signal and the second spreading code vector.

2. The method of claim 1, wherein the plurality of initial vectors is a matrix having rows that form one of an equiangular tight frame or a nearly equiangular tight frame.

3. The method of claim 1, wherein the plurality of initial vectors is a unitary matrix.

4. The method of claim 1, wherein the code map is a generalization of a discrete Fourier transform.

5. The method of claim 1, wherein the plurality of initial vectors is a matrix having rows and columns that form an orthonormal basis over $\mathbb{C}^N$, where $\mathbb{C}$ is a field of complex numbers.

6. The method of claim 1, wherein the generating the first spread signal includes multiplying each symbol from a set of symbols of the first baseband signal by the first spreading code vector.

7. The method of claim 1, further comprising transmitting at least one of the first spread signal or the second spread signal via multiple access communication.

8. A system, comprising:
at least one processor configured to:
generate a plurality of initial vectors;
apply a code map to each initial vector from the plurality of initial vectors to produce an associated spreading code vector, the code map defined such that an inner product of: (1) a first spreading code vector from the plurality of spreading code vectors, based on a first initial vector from the plurality of initial vectors; and (2) a second spreading code vector from the plurality of spreading code vectors, based on a second initial vector from the plurality of initial vectors, is equal to a product of (i) an inner product of the first initial vector and the second initial vector, and (ii) a positive constant;
generate at least one of:
a first spread signal based on a first baseband signal and the first spreading code vector; or
a second spread signal based on a second baseband signal and the second spreading code vector.

9. The system of claim 8, wherein the plurality of initial vectors is a matrix having rows that form one of an equiangular tight frame or a nearly equiangular tight frame.

10. The system of claim 8, wherein the plurality of initial vectors is a matrix having rows and columns that form an orthonormal basis over $\mathbb{C}^N$, where $\mathbb{C}$ is a field of complex numbers.

11. The system of claim 8, wherein the plurality of initial vectors is a unitary matrix.

12. The system of claim 8, wherein the code map is a generalization of a discrete Fourier transform.

13. The system of claim 8, further comprising a plurality of signal receivers and a signal transmitter, wherein the signal transmitter and the plurality of signal receivers being configured to perform multiple access communication.

14. The system of claim 8, wherein the processor is configured to generate the first spread signal by multiplying each symbol from a set of symbols of the first baseband signal by the first spreading code vector.

15. A non-transitory storage medium comprising code that, when executed by a processor, causes the processor to:
generate a plurality of initial vectors;
apply a code map to each initial vector from the plurality of initial vectors to produce an associated spreading code vector of a plurality of spreading code vectors, the code map defined such that an inner product of: (1) a first spreading code vector from the plurality of spreading code vectors, based on a first initial vector of the plurality of initial vectors; and (2) a second spreading code vector from the plurality of spreading code vectors, based on a second initial vector of the plurality of initial vectors, is equal to a product of (i) an inner product of the first initial vectors and the second initial vector, and (ii) a positive constant;
generate at least one of:
a first spread signal based on a first baseband signal and the first spreading code vector; or
a second spread signal based on a second baseband signal and the second spreading code vector.

16. The non-transitory storage medium of claim 15, wherein the plurality of initial vectors is a matrix having rows that form one of an equiangular tight frame or a nearly equiangular tight frame.

17. The non-transitory storage medium of claim 15, wherein the plurality of initial vectors is a matrix having rows and columns that form an orthonormal basis over $\mathbb{C}^N$, where $\mathbb{C}$ is a field of complex numbers.

18. The non-transitory storage medium of claim 15, wherein the plurality of initial vectors is a unitary matrix.

19. The non-transitory storage medium of claim 15, wherein the code map is a generalization of a discrete Fourier transform.

20. The non-transitory storage medium of claim 15, wherein the code to cause the processor to generate the first spread signal includes code to cause the processor to multiply each symbol from a set of symbols of the first baseband signal by the first spreading code vector.

* * * * *